(No Model.)

M. VON DOLIVO-DOBROWOLSKY.
ALTERNATING CURRENT MOTOR.

No. 456,804.  Patented July 28, 1891.

UNITED STATES PATENT OFFICE.

MICHAEL VON DOLIVO-DOBROWOLSKY, OF BERLIN, GERMANY, ASSIGNOR TO THE ALLGEMEINE ELEKTRICITÄTS-GESELLSCHAFT, OF SAME PLACE.

ALTERNATING-CURRENT MOTOR.

SPECIFICATION forming part of Letters Patent No. 456,804, dated July 28, 1891.

Application filed December 23, 1890. Serial No. 375,630. (No model.)

*To all whom it may concern:*

Be it known that I, MICHAEL VON DOLIVO-DOBROWOLSKY, a subject of the Emperor of Russia, residing at Berlin, Prussia, have invented a new and useful Improvement in Alternating-Current Motors, whereof the following is a specification.

My invention relates to such electric motors as are driven by a plurality of alternating currents of respectively differing phases. As is well known, motion is produced in the said motors in this manner, that the alternating currents are caused to generate in a body of iron, constituting a field-magnet, magnetic poles which continuously alter their position, and that an armature placed movably under the influence of the said poles is forced by the latter to partake of their motion.

The improvement forming the subject of my invention consists in the particular arrangement and combination, with the motor, of the conductors serving to receive the operating currents; and its purpose is to simplify the motor, to impart to it greater stability, to enhance the security of its keeping in working order, and to increase its useful effect. The conductors consist in a limited number of thick bars of a good conducting material, such as copper, the said number depending upon the number of alternating currents employed. If, for instance, there is but one pair of circumrotating poles, and if two alternating currents are employed whose phases are shifted in respect to each other by one-quarter of a phase, the number of conductor-bars is four, while if with the two poles three alternating currents having their phases shifted by one-sixth of a phase are used, six bars are wanted, &c. These bars are passed through the body of iron composed of divisional parts, such as disks, and they are insulated therefrom. Besides, they are all well conductively connected together at one end—for instance, by a disk, a ring, or a star of metal—while to the other ends are attached the wires that supply the currents. This system of connecting together at one point the conductors appertaining to different circuits is possible, because in all the conductors there is from the source of current to the aforesaid point of connection the same decrease of tension, so that the individual circuits would present the same potentials at the said point, even if they were not connected together.

Figure 1:
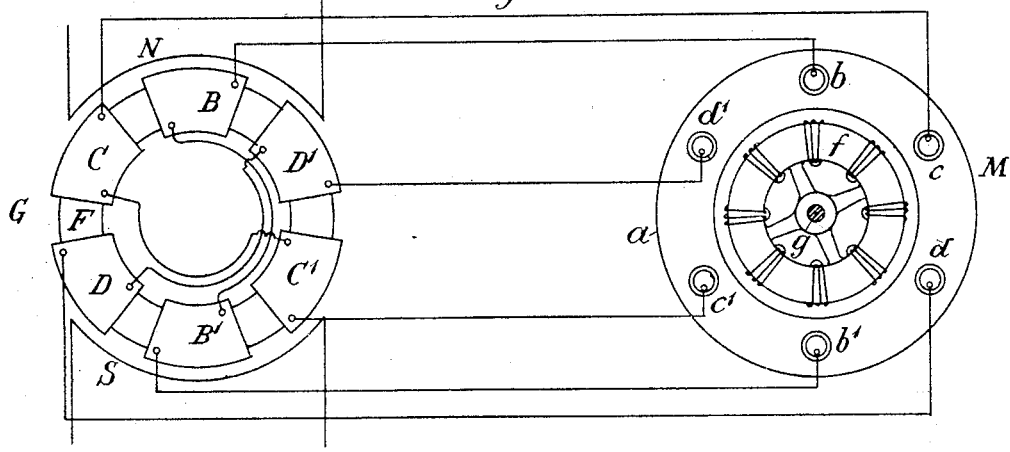
Figure 2:
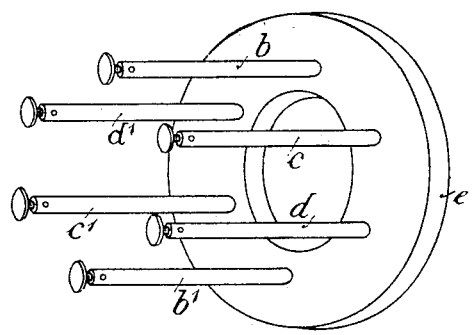
Figure 3:
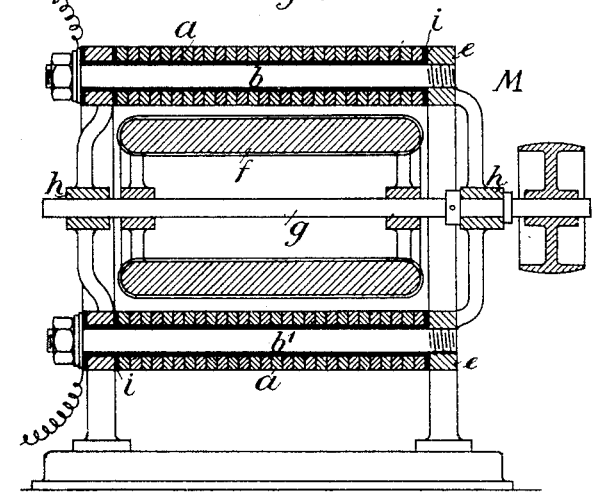

In the annexed drawings, Figure 1 is a diagrammatic view of a motor M, arranged according to my invention, in combination with a dynamo G for producing differential phase alternating currents. Fig. 2 is a perspective view of the system of conductor-bars belonging to the motor. Fig. 3 is a longitudinal sectional view of the motor.

The motor M, Figs. 1 and 3, consists in the body of iron $a$, constituting the field-magnet, and composed of a series of annular disks, six conductor-bars $b\ b'\ c\ c'\ d\ d'$, Figs. 1 and 2, the conductive ring $e$, to which the bars are fixed, and the armature $f$, provided with a plurality of coils. The armature is mounted on the shaft $g$, rotating in the bearings $h$. The thick lines $i$, Fig. 3, denote the insulating-films serving to prevent electric contact between the conductor-bars and the ring $e$ on one hand and the body $a$ and other parts on the other hand.

The dynamo G comprises a field-magnet, whereof only the pole-pieces N S are shown in the drawings, and an armature F, carrying six coils B B' C C' D D', arranged at angles of sixty degrees apart from each other, and the opposite ones whereof are connected together, so that when the armature is rotated there will be generated in the three pairs of coils three alternating currents differing in their phases by one-sixth of a phase. The coils B and B' are connected by conducting-wires to the respective bars $b\ b'$ of the motor, the coils C C' to the bars $c\ c'$, and the coils D D' to the bars $d\ d'$, so that three circuits are obtained. (The contact rings and brushes requied for this connection have been omitted in the drawings.) Under these conditions the combined operation of the three currents will have the effect of producing in the motor a rotating magnetic field, whereby the armature $f$ is put in rotation. The coils of the said armature $f$ are of the closed-circuit type—*i. e.*, the terminals of each coil are connected together and they are not supplied with current from outside. The number of these coils is variable and independent of the number of conductor-bars of the field-magnet, and armatures differing in arrangement from that shown in the drawings may be employed.

I claim as my invention—

In an electric motor, the combination of an iron body $a$, constituting a field-magnet, a number of conductor-bars, such as $b\ b'\ c\ c'\ d\ d'$, passing through the said body and insulated therefrom, means for conductively connecting all the said bars together at one end, electric circuits, the terminals whereof are connected to the other ends of the said bars, and means for exciting in the said circuits differential-phase alternating currents, substantially as described.

In testimony whereof I have hereunto set my hand in the presence of two subscribing witnesses.

MICHAEL VON DOLIVO-DOBROWOLSKY.

Witnesses:
OSKAV VON GOEBEN,
SIMON ROOS.